US012781447B2

(12) United States Patent
Thiesse

(10) Patent No.: US 12,781,447 B2
(45) Date of Patent: Nov. 3, 2026

(54) SYSTEMS AND METHODS FOR IMPROVING A DENSITY QUALITY OF A PAVING MATERIAL MAT LAID BY A PAVING MACHINE

(71) Applicant: Caterpillar Paving Products Inc., Brooklyn Park, MN (US)

(72) Inventor: Ryan Todd Thiesse, Otsego, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 591 days.

(21) Appl. No.: 18/334,942

(22) Filed: Jun. 14, 2023

(65) Prior Publication Data

US 2024/0417935 A1 Dec. 19, 2024

(51) Int. Cl.
*E01C 19/28* (2006.01)
*G01N 9/36* (2006.01)

(52) U.S. Cl.
CPC ............. *E01C 19/288* (2013.01); *G01N 9/36* (2013.01)

(58) Field of Classification Search
CPC ................................ E01C 19/288; G01N 9/36
See application file for complete search history.

(56) References Cited

U.S. PATENT DOCUMENTS

| | | | | |
|---|---|---|---|---|
| 6,122,601 | A | 9/2000 | Thomas et al. | |
| 8,930,092 | B2 | 1/2015 | Minich | |
| 9,068,295 | B2 | 6/2015 | Rutz et al. | |
| 9,903,077 | B2 | 2/2018 | Rio et al. | |
| 10,696,324 | B2 | 6/2020 | Oetken | |
| 11,313,086 | B2 | 4/2022 | Hedrington | |
| 2002/0168226 | A1* | 11/2002 | Feucht | E01C 19/407 404/102 |
| 2017/0205999 | A1* | 7/2017 | Marsolek | G07C 5/0808 |
| 2018/0030672 | A1* | 2/2018 | Marsolek | E01C 23/07 |
| 2021/0180271 | A1* | 6/2021 | Hedrington | E01C 19/48 |
| 2021/0277609 | A1* | 9/2021 | Gallagher | E01C 19/48 |

FOREIGN PATENT DOCUMENTS

WO 2021133680 A1 7/2021

* cited by examiner

*Primary Examiner* — Andrew Schechter
*Assistant Examiner* — Ethan Wesley Edwards

(57) ABSTRACT

In some implementations, a management system may obtain, from a compactor machine, compaction data associated with a paving material mat laid by the paving machine. The management system may process the compaction data to determine one or more density values associated with the paving material mat. The management system may cause one or more actions to be performed based on the one or more density values.

20 Claims, 4 Drawing Sheets

SYSTEMS AND METHODS FOR IMPROVING A DENSITY QUALITY OF A PAVING MATERIAL MAT LAID BY A PAVING MACHINE

TECHNICAL FIELD

The present disclosure relates generally to a paving machine, for example, to improve a quality of a paving material mat laid by the paving machine.

BACKGROUND

Paving machines (also referred to as road pavers) are commonly used to apply, spread, and/or compact a paving material mat (e.g., a mat of bituminous roadway material) relatively evenly over a work surface. These machines are generally used in the construction of roads, parking lots, and other areas. A typical paving machine employs a screed assembly (sometimes referred to as a floating screed), a tamper, an auger, and/or other components, to facilitate laying of a paving material mat. Following deposition of a paving material mat by the paving machine, a compactor machine may travel over the mat to further compact the paving material.

Often, however, the paving material mat can lack a consistent density quality and/or preferred density quality when laid by the paving machine. For example, a portion of the paving material mat may have a different density than another portion of the paving material mat. Or, as another example, the paving material mat may be more, or less, dense than is required for a particular work surface. This may be due to one or more settings associated with the screed assembly, the tamper, the auger, and/or the other components of the paving machine. Often, an operator may have difficulty recognizing when the paving material mat lacks a consistent density quality and/or preferred density quality, and/or how to adjust the one or more settings to cause the paving machine to lay a paving material mat with a consistent density quality and/or preferred density quality.

U.S. Pat. No. 11,313,086 (the '086 patent) discloses a density sensor coupled to a paving machine that is configured to measure a density of an asphalt mat as a screed of the paving machine passes over the asphalt mat. The density sensor can include ground penetrating radar, a nuclear density gauge, a non-nuclear density gauge, or other asphalt density meters or sensors. While the '086 patent discloses some benefits, the management system of the present disclosure allows for determining of density values associated with a paving material mat when the paving machine does not include a density sensor, or when using a density sensor to measure a density of the paving material mat is not practical (e.g., due to an amount of time necessary to measure the density of the paving material mat using a density sensor).

The management system of the present disclosure solves one or more of the problems set forth above and/or other problems in the art.

SUMMARY

A method may include obtaining, by a management system of a paving machine and from a compactor machine, compaction data associated with a paving material mat laid by the paving machine; processing, by the management system, the compaction data to determine one or more density values associated with the paving material mat; and causing, by the management system, one or more actions to be performed based on the one or more density values.

A management system of a paving machine may include one or more memories; and one or more processors configured to: obtain compaction data associated with a paving material mat laid by the paving machine; process the compaction data to determine one or more density values associated with the paving material mat; and cause one or more actions to be performed based on the one or more density values.

A paving machine may include a screed assembly; a material disposition apparatus; a tamper; and a management system that is configured to: process compaction data associated with a paving material mat laid by the paving machine to determine one or more density values associated with the paving material mat; and provide information indicating the one or more density values.

DETAILED DESCRIPTION

This disclosure relates to a management system, which is applicable to any machine that lays a paving material mat (e.g., a paving machine, such as a road paver, an asphalt finisher, or a similar machine).

Figure 1:
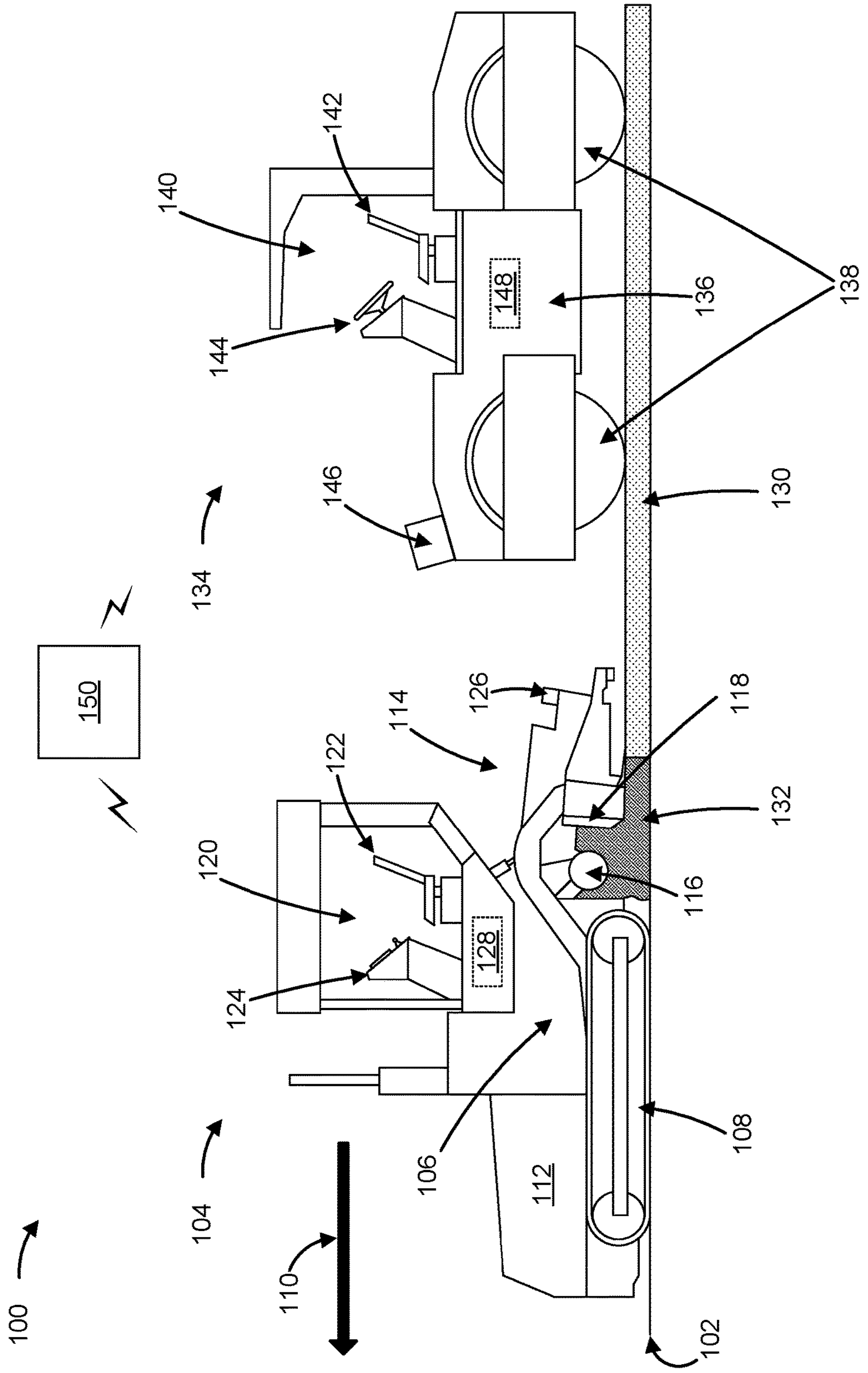
FIG. 1 is a diagram of an example implementation described herein.

FIG. 1 is a diagram of an example implementation 100 described herein. As shown in FIG. 1, the implementation 100 may include a work surface 102 and a first machine 104. The first machine 104 may be a mobile machine or vehicle that is configured to traverse the work surface 102, and may include a paving machine. Further, the first machine 104 may be a manned machine or an unmanned machine, and/or may be fully-autonomous, semi-autonomous, or remotely operated.

Accordingly, as further shown in FIG. 1, the first machine 104 may include a frame 106, a travelling system 108 (e.g., to allow the first machine 104 to move in a direction 110), a hopper 112, a screed assembly 114, a material disposition apparatus 116, a tamper 118, an operator station 120, a chair 122, a control panel 124, at least one sensing device 126, and/or a management system 128. The first machine 104 may be configured to lay a paving material mat 130 (e.g., that comprises a paving material 132).

The frame 106 may support the travelling system 108, which may include a track-style traveling system (shown) or a traveling system comprising wheels. The first machine 104 may be configured to move (e.g., to travel) in a direction 110 (e.g., via the travelling system 108), such that the first machine 104 may lay the paving material mat 130 on the work surface 102, as described further herein. A "forward" portion of the first machine 104 may refer to a portion of the first machine 104 located toward a front of the first machine 104 with respect to the direction 110, and a "rear" portion of the first machine 104 may refer to a portion of the first machine 104 located toward a rear of the first machine 104 with respect to the direction 110.

The hopper 112 may be mounted at a forward portion of the first machine 104 and may be configured to receive the paving material 132 (e.g., bituminous aggregate material, such as asphalt) from a transport vehicle (e.g., a dump truck), and to retain the paving material 132 pending distribution of the paving material 132 on the work surface 102 to be paved by the first machine 104.

The screed assembly 114 may be disposed at a rear portion of the first machine 104 and may be configured to apply, spread, and/or compact the paving material 132 on the work surface 102. In this way, the screed assembly 114 may facilitate laying of the paving material mat 130 by the first machine 104. The screed assembly 114 may include one or more sections (e.g., a fixed section and/or one or more extendable sections respectively attached to an end of the fixed section). Each section may include a screed plate and/or another component to facilitate laying of the paving material mat 130. An angle of attack (e.g., an angle that the screed plate and/or the other component makes with the work surface 102), a height (e.g., a height that the screed plate and/or the other component is away from the work surface 102), and/or other characteristics of the screed plate and/or the other component of the section may be configured by one or more settings associated with the section.

The material disposition apparatus 116 may be disposed at a rear portion of the first machine 104 (and may be coupled to the screed assembly 114) and may include at least one auger (e.g., at least one flighted auger). The material disposition apparatus 116 may be configured to receive the paving material 132 (e.g., from the hopper 112) and spread the paving material 132 (e.g., beneath the screed assembly 114).

The tamper 118 may be disposed at a rear portion of the first machine 104 (and may be coupled to the screed assembly 114) and may include a tamper bar (not shown) or another component. The tamper 118 may be configured to tamp (e.g., pre-compact) the paving material 132, such as after the paving material 132 has been spread by the material disposition apparatus 116. In this way, the tamper 118 may reduce a prevalence of gaps and voids within the paving material 132 prior to the screed assembly 114 contacting the paving material 132.

The operator station 120 may be disposed at a rear portion of the first machine 104. The operator station 120 may be provided so that an operator, seated in the chair 122, can control operation of the first machine 104, the screed assembly 114, the material disposition apparatus 116, the tamper 118, and/or other components of the first machine 104 by way of controls provided on the control panel 124 (e.g., that includes a controller that is configured to communicate with one or more components of the first machine 104). The control panel 124 may also include a display (e.g., a monitor) to display information and/or messages concerning the first machine 104, the screed assembly 114, the material disposition apparatus 116, the tamper 118, and/or other components of the first machine 104, the paving material mat 130 and/or the paving material 132; and/or other information.

The at least one sensing device 126 may be disposed at a rear portion of the first machine 104 (e.g., on or near the screed assembly 114). The at least one sensing device 126 may include any type of sensor configured to capture paving data (e.g., image data, distance data, and/or other data) related to the paving material mat 130. The at least one sensing device 126 may include at least one camera device, at least one light detection and ranging (LIDAR) device, and/or the like to capture the image data, the distance data, and/or the other data that comprises the paving data.

For example, when the paving material mat 130 includes one or more portions (e.g., that form a region of the paving material mat 130, such as a region that extends across a width of the paving material mat 130), the at least one sensing device 126 may include a single camera device configured to capture image data (e.g., one or more images of each portion of the paving material mat 130), distance data (e.g., one or more distances from the single camera device to each portion), and/or other data related to each portion. As another example, the at least one sensing device 126 may include a plurality of camera devices, where each camera device is configured to capture image data, distance data, and/or other data related to a respective portion, of the one or more portions, of the paving material mat 130. In another example, the at least one sensing device 126 may include a plurality of LIDAR devices, where each LIDAR device is configured to capture distance data related to a respective portion, of the one or more portions, of the paving material mat 130.

The at least one sensing device 126 may be configured to send the paving data (e.g., directly or via one or more other components or devices of the first machine 104) to the management system 128. The at least one sensing device 126 may send the paving data (e.g., as a data stream, as a signal, and/or the like) to the management system 128 as the at least one sensing device 126 collects the paving data.

The management system 128 may include an electronic control module (ECM) or other computing device. The management system 128 may be configured to process compaction data, which is further described herein, and to cause one or more actions to be performed based on processing the compaction data. The management system 128 is further described herein in connection with FIGS. 2-3.

As further shown in FIG. 1, the implementation 100 may include a second machine 134. The second machine 134 may be a mobile machine or vehicle that is configured to traverse the work surface 102, and may include a compactor machine (e.g., a pavement compaction machine, a roller machine, or a similar type of machine). Further, the second machine 134 may be a manned machine or an unmanned machine, and/or may be fully-autonomous, semi-autonomous, or remotely operated.

Accordingly, as further shown in FIG. 1, the second machine 134 may include a frame 136, one or more rollers 138, an operator station 140, a chair 142, a control panel 144, at least one sensing device 146, and/or a communication system 148. The second machine 134 may be configured to compact the paving material mat 130 (e.g., that is laid by the first machine 104).

The frame 136 may support the one or more rollers 138. The second machine 134 may be configured to move (e.g., to travel) in the direction 110 (e.g., via the one or more rollers 138), such that the second machine 134 may compact the paving material mat 130 on the work surface 102, as described further herein. A "forward" portion of the second machine 134 may refer to a portion of the second machine 134 located toward a front of the second machine 134 with respect to the direction 110, and a "rear" portion of the second machine 134 may refer to a portion of the second machine 134 located toward a rear of the second machine 134 with respect to the direction 110.

Each roller 138 may be configured to compact the paving material mat 130, such as by applying a pressure to the paving material mat 130 when the second machine 134 moves (e.g., travels) in the direction 110 (via the one or more rollers 138). Each roller 138 may include a weight, or one or more other components, to increase an amount of pressure that can be applied to the paving material mat 130. The one or more rollers 138, based on rolling on the paving material mat 130, may reduce a prevalence of gaps and voids within the paving material mat 130.

The operator station 140 may be disposed at a front portion or a rear portion of the second machine 134. The operator station 140 may be provided so that an operator, seated in the chair 142, can control operation of the second machine 134, the one or more rollers 138, and/or other components of the second machine 134 by way of controls provided on the control panel 144 (e.g., that includes a controller that is configured to communicate with one or more components of the second machine 134).

The at least one sensing device 146 may be disposed at a front portion of the second machine 134. The at least one sensing device 146 may include any type of sensor configured to capture compaction data (e.g., temperature data, moisture data, compaction effort data, location data, and/or other data) related to the paving material mat 130. For example, the at least one sensing device 146 may include at least one temperature sensor (e.g., at least one infrared temperature sensor), at least one moisture sensor (e.g., at least one electric or electromagnetic moisture sensor), at least one compaction effort sensor (e.g., at least one accelerometer or other sensor to measure vibrations of the second machine 134 during compaction of the paving material mat 130), at least one location sensor (e.g., at least one global positioning sensor (GPS)), and/or other sensors. In this way, the at least one sensing device 146 may capture temperature data (e.g., that indicates one or more temperature measurements associated with the paving material mat 130), moisture data (e.g., that indicates one or more moisture measurements associated with the paving material mat 130), compaction effort data (e.g., that indicates one or more compaction effort measurements associated with the paving material mat 130), location data (e.g., that indicates one or more location measurements associated with the paving material mat 130), and/or other data that comprises the compaction data. In some implementations, the at least one sensing device 146 may include at least one density sensor (e.g., at least one nuclear density gauge, or other density sensor) and may be configured to capture density data related to the paving material mat 130 as the compaction data.

In some implementations, when the paving material mat 130 includes one or more portions (e.g., that form a region of the paving material mat 130, such as across a width of the paving material mat 130), the at least one sensing device 146 may include a single temperature sensor, a single moisture sensor, a single compaction effort sensor, and/or a single location sensor to respectively capture temperature data, moisture data, compaction effort data, and/or location data associated with each portion of the paving material mat 130. As another example, the at least one sensing device 146 may include a plurality of temperature sensors, a plurality of moisture sensors, a plurality of compaction effort sensors, and/or a plurality of location sensors to respectively capture temperature data, moisture data, compaction effort data, and/or location data related to a respective portion, of the one or more portions, of the paving material mat 130.

The at least one sensing device 146 may be configured to send the compaction data (e.g., directly or via one or more other components or devices of the first machine 104) to the communication system 148. The at least one sensing device 146 may send the compaction data (e.g., as a data stream, as a signal, and/or the like) to the communication system 148 as the at least one sensing device 146 collects the compaction data.

The communication system 148 may include an ECM or other computing device. The communication system 148 may be configured to send the compaction data to the first machine 104 (e.g., the management system 128 of the first machine 104). The communication system 148 is further described herein in connection with FIGS. 2-3.

As further shown in FIG. 1, the implementation 100 may include a communication relay device 150. The communication relay device 150 may be configured to facilitate an indirect wireless connection between the first machine 104 and the second machine 134. For example, the management system 128 of the first machine 104 and the communication system 148 of second machine 134 may be configured to wirelessly communicate with each other via an indirect wireless connection (e.g., by using the communication relay device 150 as a communication intermediary). Alternatively, the management system 128 of the first machine 104 and the communication system 148 of second machine 134 may be configured to wirelessly communicate with each other via a direct wireless connection (e.g., by not using the communication relay device 150).

As indicated above, FIG. 1 is provided as an example. Other examples may differ from what is described in connection with FIG. 1.

Figure 2:
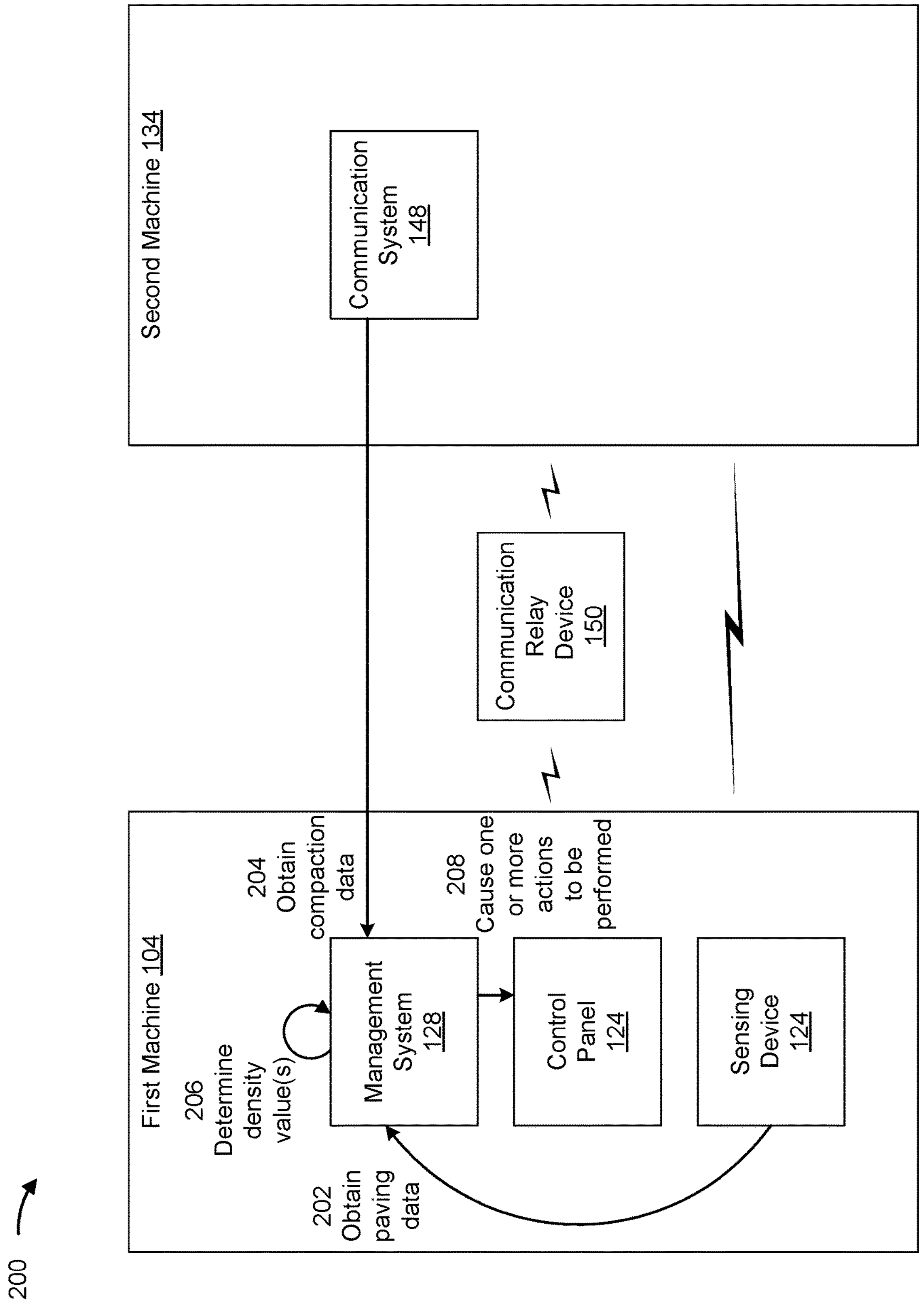
FIG. 2 is a diagram of an example implementation described herein.

FIG. 2 is a diagram of an example implementation 200 described herein. FIG. 2 shows how the first machine 104 (e.g., the management system 128 and the control panel 124 of the first machine 104), the second machine 134 (e.g., the communication system 148 of the second machine 134), and/or the communication relay device 150 may communicate with each other. The first machine 104, the second machine 134, and/or the communication relay device 150 may interconnect via wired connections, wireless connections, or a combination of wired and wireless connections.

As shown in FIG. 2, and by reference number 202, the management system 128 of the first machine 104 may obtain paving data associated with the paving material mat 130 laid by the first machine 104. For example, the management system 128 may obtain the paving data from the at least one sensing device 126 (e.g., as the paving material mat 130 is laid by the first machine 104). The paving data may include, for example, image data, distance data, and/or other data related to the paving material mat 130 (e.g., related to one or more portions of the paving material mat 130).

As shown in FIG. 2, and by reference number 204, the management system 128 of the first machine 104 may obtain compaction data associated with the paving material mat 130 laid by the first machine 104. For example, the communication system 148 of the second machine 134 may send (e.g., via a direct wireless connection between the communication system 148 and the management system 128, or via an indirect wireless connection between the communication system 148 and the management system 128 using the communication relay device 150) the compaction data to the management system 128. The compaction data may include, for example, temperature data (e.g., that indicates one or more temperature measurements associated with the paving material mat 130), moisture data (e.g., that indicates one or more moisture measurements associated with the paving material mat 130), compaction effort data (e.g., that indicates one or more compaction effort measurements associated with the paving material mat 130), location data (e.g., that indicates one or more location measurements associated with the paving material mat 130), and/or other data. The temperature data, the moisture data, the compaction effort data, the location data, and/or the other data may be related to one or more portions of the paving material mat 130. In some implementations, the compaction data may include density data related to the paving material mat 130 (e.g., related to one or more portions of the paving material mat 130).

As shown by reference number 206, the management system 128 may process the compaction data to determine one or more density values associated with the paving material mat 130. For example, the management system 128 may identify the temperature data, the moisture data, the compaction effort data, the location data, and/or the other data related to the paving material mat 130 that is included in the compaction data, and may therefore process, using one or more data processing techniques, the temperature data, the moisture data, the compaction effort data, the location data, and/or the other data to determine the one or more density values. Each density value may indicate an estimated density of one or more portions of the paving material mat 130. In some implementations, when the compaction data includes the density data, the management system 128 may identify the density data in the compaction data, and may process (e.g., read, parse, and/or use one or more data processing techniques) the density data to determine the one or more density values.

In some implementations, the management system 128 may process the compaction data and the paving data to determine the one or more density values. For example, the management system 128 may identify the image data, distance data, and/or other data related to the paving material mat 130 that is included in the paving data. The management system 128 may therefore process, using one or more data processing techniques, the temperature data, moisture data, compaction effort data, location data, and/or other data included in the compaction data and the image data, distance data, and/or other data included in the paving data to determine the one or more density values. In this way, the management system 128 may obtain more accurate density values as compared to when the management system 128 processes only the compaction data to determine the one or more density values (e.g., because more and different data associated with the one or more portions of the paving material mat 130 is processed).

As shown by reference number 208, the management system 128 may cause one or more actions to be performed (e.g., based on the one or more density values). For example, the management system 128 may automatically control one or more components of the first machine 104 to cause the one or more actions to be performed. As another example, the management system 128 may provide information indicating the one or more density values to the control panel 124 (e.g., to the controller of the control panel 124), which permits the one or more actions to be performed by the control panel 124 (e.g., the controller of the control panel 124), either under operator control or autonomously.

The one or more actions may include adjusting one or more settings associated with the first machine 104. For example, the management system 128 may automatically adjust the one or more settings. As another example, the management system 128 may provide information indicating the one or more density values to the control panel 124 (e.g., to the controller of the control panel 124), which may allow the control panel 124 (e.g., the controller of the control panel 124) to cause the one or more settings associated with first machine 104 to be adjusted (e.g., by causing one or more commands to be issued to adjust the one or settings, either autonomously or by operator intervention).

The one or more settings may include, for example, one or more settings associated with the screed assembly 114 (e.g., one or more settings associated with an angle of attack of at least one section of the screed assembly 114, a height of the at least one section of the screed assembly 114, or another configuration of the at least one section of the screed assembly 114), one or more settings associated with the material disposition apparatus 116 (e.g., one or more settings associated with a speed of at least one auger of the material disposition apparatus 116, a pitch of the at least one auger, a direction of the at least one auger, or another configuration of the at least one auger), one or more settings associated with the tamper 118 (e.g., one or more settings associated with an amplitude of the tamper 118, a frequency of the tamper 118, a depth of the tamper 118, a force of the tamper 118, or another configuration of the tamper 118), and/or one or more other settings associated with the first machine 104 (e.g., one or more settings associated with a speed of the first machine 104, a heading of the first machine 104, a down pressure of the first machine 104, or another configuration of the first machine 104). In this way, the management system 128 may control (e.g., automatically control) at least one of the screed assembly 114, the material disposition apparatus 116, or the tamper 118 (e.g., by controlling an adjustment associated with the at least one of the screed assembly 114, the material disposition apparatus 116, or the tamper 118).

In some implementations, the management system 128 providing the information indicating the one or more density values may cause the information to be presented on the display of the first machine 104. For example, providing the information to the control panel 124 (e.g., to the controller of the control panel 124) may allow the control panel 124 (e.g., the controller of the control panel 124) to cause the information to be presented on the display of the control panel 124 (e.g., by causing one or more commands to be issued to present the information on the display). The information may be presented in a graphical form, such as by presenting a rectangle that represents the paving material mat 130, where one or more or more portions of the paving material mat 130 are shaded with respective colors (e.g., where a first color, such as green, indicates that a corresponding portion has a density value within a preferred density value range; a second color, such as yellow, indicates that a corresponding portion has a density value less than a minimum of the preferred density value range; and a third color, such as red, indicates that a corresponding portion has a density value greater than a maximum of the preferred density value range). In some embodiments, the operator of machine 104 may manually adjust one or more aspects of machine operation to increase the prevalence of areas shaded green.

As indicated above, FIG. 2 is provided as an example. Other examples may differ from what is described in connection with FIG. 2.

Figure 3:
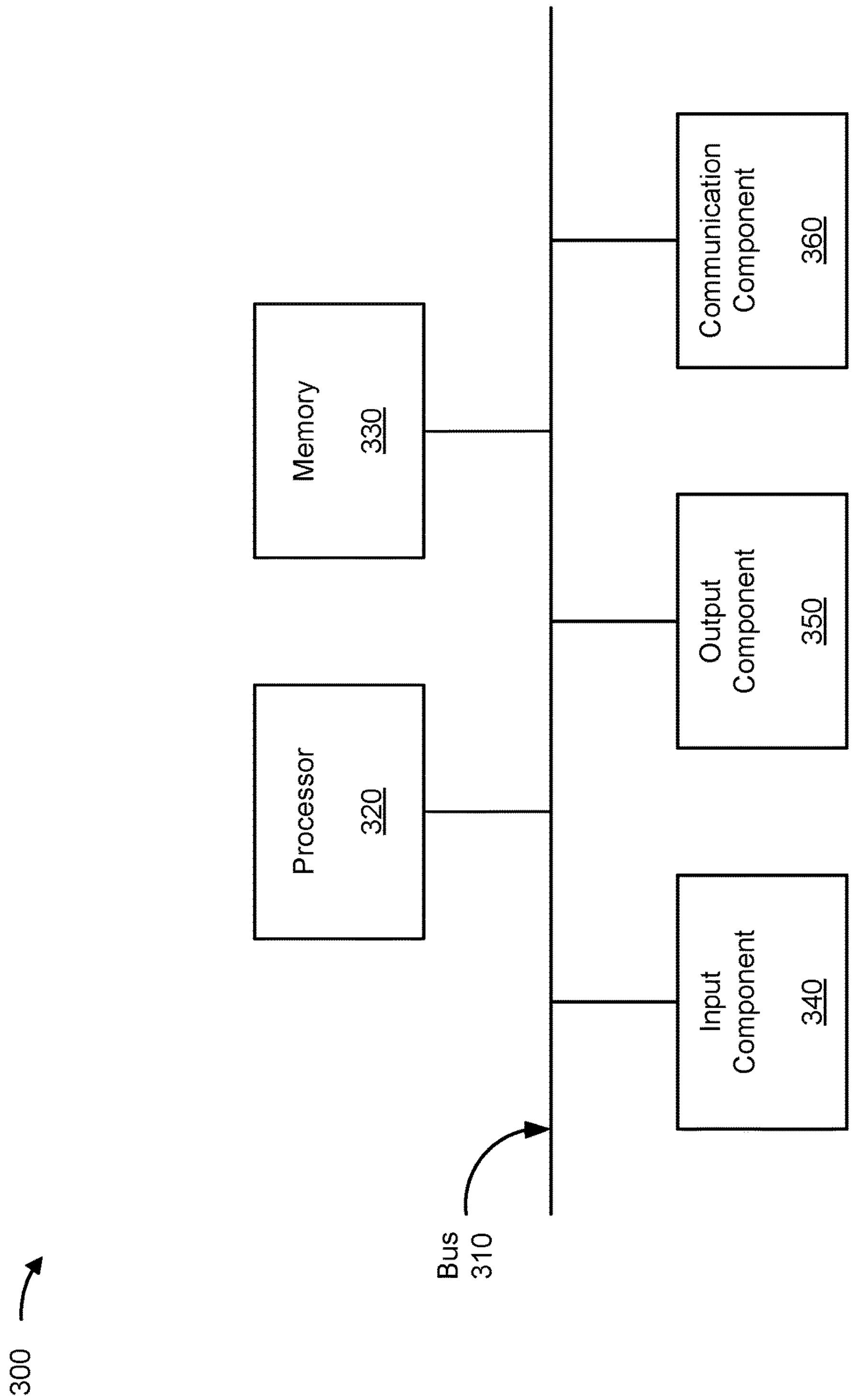
FIG. 3 is a diagram of example components of a device described herein.

FIG. 3 is a diagram of example components of a device 300 associated with improving a density quality of a paving material mat laid by a paving machine. The device 300 may correspond to the control panel 124 (e.g., the controller of the control panel 124), the at least one sensing device 126, the management system 128, a control panel 144 (e.g., the controller of the control panel 144), the at least one sensing device 146, the communication system 148, and/or the communication relay device 150. In some implementations the control panel 124 (e.g., the controller of the control panel 124), the at least one sensing device 126, the management system 128, a control panel 144 (e.g., the controller of the control panel 144), the at least one sensing device 146, the communication system 148, and/or the communication relay device 150 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
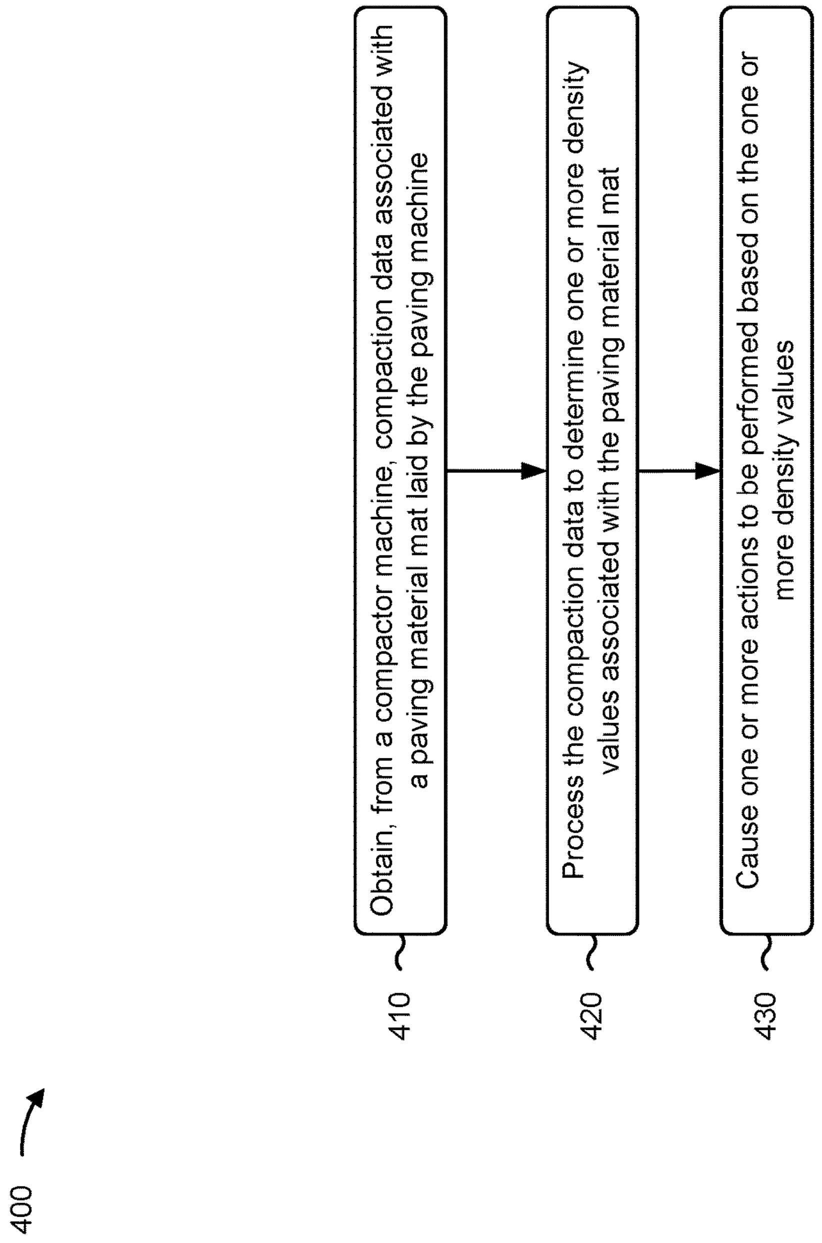
FIG. 4 is a flowchart of an example process associated with improving a density quality of a paving material mat laid by a paving machine.

FIG. 4 is a flowchart of an example process 400 associated with improving a density quality of a paving material mat laid by a paving machine. One or more process blocks of FIG. 4 may be performed by a management system (e.g., the management system 128). Additionally, or alternatively, one or more process blocks of FIG. 4 may be performed by another device or a group of devices separate from or including the management system, such as another device or component that is internal or external to the first machine 104.

As shown in FIG. 4, process 400 may include obtaining, from a compactor machine, compaction data associated with a paving material mat laid by the paving machine (block 410). For example, the management system may obtain, from a compactor machine, compaction data associated with a paving material mat laid by the paving machine, as described above. The compaction data is obtained via a direct wireless connection with the compactor machine, or, alternatively, via an indirect wireless connection with the compactor machine. The compaction data indicates at least one of one or more compaction effort measurements associated with the paving material mat, one or more moisture measurements associated with the paving material mat, one or more temperature measurements associated with the paving material mat, or one or more location measurements associated with the paving material mat.

As further shown in FIG. 4, process 400 may include processing the compaction data to determine one or more density values associated with the paving material mat (block 420). For example, the management system may process the compaction data to determine one or more density values associated with the paving material mat, as described above. The paving material mat includes one or more portions, and each density value, of the one or more density values, indicates an estimated density of a portion of the paving material mat.

In some implementations, processing the compaction data to determine the one or more density values associated with the paving material mat includes obtaining, from at least one sensing device of the paving machine, paving data associated with the paving material mat, and processing the compaction data and the paving data to determine the one or more density values associated with the paving material mat.

As further shown in FIG. 4, process 400 may include causing one or more actions to be performed based on the one or more density values (block 430). For example, the management system may cause one or more actions to be performed based on the one or more density values, as described above.

Causing the one or more actions to be performed may include automatically adjusting one or more settings associated with the paving machine based on the one or more density values. The one or more settings associated with the paving machine include at least one of one or more settings associated with a screed assembly of the paving machine, one or more settings associated with a material disposition apparatus of the paving machine, or one or more settings associated with a tamper of the paving machine.

Causing the one or more actions to be performed may include causing information indicating the one or more density values to be presented on a display of the paving machine.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed management system (e.g., the management system 128), when included in a paving machine, may be used to improve a density quality of a paving material mat laid by the paving machine. The management system is able to obtain, from a communication system of a compactor machine (e.g., via a wireless connection), compaction data associated with a paving mat laid by the paving machine, and to process the compaction data to determine one or more density values associated with the paving material mat. Each density value may indicate, for example, an estimated density of a portion of the paving material mat (e.g., a portion of a region of the paving material that extends across a width of the paving material mat). The management system thereby causes one or more actions to be performed (e.g., based on the one or more density values). For example, the management system may cause adjustment of one or more settings associated with the paving machine (e.g., one or more settings of a screed assembly, a material disposition apparatus, a tamper, or other component of the paving machine). That is, the management system may enable automatic control of the one or more settings associated with the paving machine. As another example, the management system may cause information to be presented on a display of the paving machine, which enables an operator (e.g., upon viewing the information presented on the display) to manually adjust the one or more settings associated with the paving machine.

In this way, the management system facilitates (e.g., by causing the one or more actions to be performed) an improved density quality of a subsequent paving material mat laid by the paving machine (e.g., as compared to the paving material mat). For example, the management system may cause the one or more settings to be adjusted such that the subsequent paving material mat has a more consistent density quality (e.g., a uniform density across a width of the subsequent paving material mat) and/or has a preferred density quality (e.g., the density of the subsequent paving material mat is within a preferred density range). This reduces a likelihood that the subsequent paving material mat will need to be repaired, torn up and repaved, or otherwise reworked. Accordingly, this minimizes unnecessary additional usage of the paving machine, which extends an operable life of the paving machine and reduces an amount of maintenance needed to maintain the paving machine.

Further, the management system is able to determine the one or more density values in real time (or near real time), and therefore the management system can automatically control the paving machine to lay a paving material mat with an improved density quality while the paving machine is laying the paving material mat. This would not otherwise be possible if the paving machine utilized a typical density sensor, such as a nuclear density gauge, which requires substantial amounts of time to obtain accurate and consistent measurements related to a paving material mat. In this way, the management system reduces an amount of time to lay a paving material mat with an improved density quality than would otherwise be possible by a paving machine that uses a typical density sensor.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

obtaining, by a management system of a paving machine and from a compactor machine, compaction data associated with a paving material mat laid by the paving machine;

processing, by the management system, the compaction data to determine one or more density values associated with the paving material mat; and causing, by the management system, an adjustment associated with at least one of an operation or a component of the paving machine based on the one or more density values.

2. The method of claim 1, wherein the paving material mat includes one or more portions, and each density value, of the one or more density values, indicates an estimated density of a portion of the paving material mat.

3. The method of claim 1, wherein the compaction data is obtained via a direct wireless connection with the compactor machine.

4. The method of claim 1, wherein the compaction data is obtained via an indirect wireless connection with the compactor machine.

5. The method of claim 1, wherein the compaction data indicates at least one of:

one or more compaction effort measurements associated with the paving material mat;

one or more moisture measurements associated with the paving material mat;

one or more temperature measurements associated with the paving material mat; or one or more location measurements associated with the paving material mat.

6. The method of claim 1, wherein processing the compaction data to determine the one or more density values associated with the paving material mat includes:

obtaining, from at least one sensing device of the paving machine, paving data associated with the paving material mat; and processing the compaction data and the paving data to determine the one or more density values associated with the paving material mat.

7. The method of claim 1, wherein causing the adjustment associated with the at least one of the operation or the component of the paving machine comprises:

causing the adjustment of one or more settings associated with the at least one of the operation or the component of the paving machine based on the one or more density values.

8. The method of claim 7, wherein the one or more settings include at least one of:

one or more settings associated with a screed assembly of the paving machine;

one or more settings associated with a material disposition apparatus of the paving machine; or one or more settings associated with a tamper of the paving machine.

9. The method of claim 1, further comprising:

causing information indicating the one or more density values to be presented on a display of the paving machine.

10. A management system of a paving machine, comprising:

one or more memories; and one or more processors, coupled to the one or more memories, configured to:

obtain, from a compactor machine, compaction data associated with a paving material mat laid by the paving machine;

process the compaction data to determine one or more density values associated with the paving material mat; and cause an adjustment associated with at least one of an operation or a component of the paving machine based on the one or more density values.

11. The management system of claim 10, wherein the compaction data is obtained from the compactor machine via a wireless connection.

12. The management system of claim 10, wherein the one or more processors, to cause the adjustment associated with the at least one of the operation or the component of the paving machine, are configured to:

cause the adjustment of one or more settings associated with the at least one of the operation or the component of the paving machine based on the one or more density values.

13. The management system of claim 10, wherein the one or more processors, to cause adjustment associated with the at least one of the operation or the component of the paving machine, are configured to:

provide information indicating the one or more density values to a controller of the paving machine to allow the controller to automatically perform the adjustment associated with the at least one of the operation or the component of the paving machine based on the information indicating the one or more density values.

14. The management system of claim 10, wherein the one or more processors, to cause the adjustment associated with the at least one of the operation or the component of the paving machine, are configured to:

cause the adjustment associated with at least one of a screed assembly of the paving machine, a material disposition apparatus of the paving machine, or a tamper of the paving machine.

15. The management system of claim 10, wherein the one or more processors are further configured to:

cause information indicating the one or more density values to be presented on a display of the paving machine.

16. A paving machine, comprising:

a screed assembly;

a material disposition apparatus;

a tamper; and a management system that is configured to:

obtain, from a compactor machine, compaction data associated with a paving material mat laid by the paving machine;

determine, based on the compaction data, one or more density values associated with the paving material mat; and cause an adjustment associated with at least one of an operation or a component of the paving machine based on the one or more density values.

17. The paving machine of claim 16, wherein the compaction data is obtained from the compactor machine via communication with the compactor machine.

18. The paving machine of claim 16, wherein to cause the adjustment associated with the at least one of the operation or the component of the paving machine, the management system is configured to:

cause the adjustment of one or more settings associated with the at least one of the operation or the component of the paving machine based on the one or more density values.

19. The paving machine of claim 16, wherein, to cause the adjustment associated with the at least one of the operation or the component of the paving machine, the management system is configured to:

provide information indicating the one or more density values to a controller of the paving machine to allow the controller to automatically perform the adjustment of at least one of the screed assembly, the material disposition apparatus, or the tamper.

20. The paving machine of claim 16, wherein, to cause the adjustment associated with the at least one of the operation or the component of the paving machine, the management system is configured to:

provide information indicating the one or more density values to a display of the paving machine to cause the display to present the information indicating the one or more density values.

* * * * *